US012762932B1

(12) United States Patent
Chen et al.

(10) Patent No.: US 12,762,932 B1
(45) Date of Patent: Oct. 13, 2026

(54) DEVICE HOUSING OF MOBILE POS TERMINAL

(71) Applicant: CASTLES TECHNOLOGY CO., LTD., New Taipei City (TW)

(72) Inventors: Yu-Tsung Chen, New Taipei City (TW); Neng-Chi Wang, Hualien County (TW)

(73) Assignee: CASTLES TECHNOLOGY CO., LTD., New Taipei City (TW)

( * ) Notice: Subject to any disclaimer, the term of this patent is extended or adjusted under 35 U.S.C. 154(b) by 0 days.

(21) Appl. No.: 19/296,722

(22) Filed: Aug. 11, 2025

(30) Foreign Application Priority Data

May 26, 2025 (TW) ................................ 114119692

(51) Int. Cl.
*G07G 1/00* (2006.01)
*G06F 1/16* (2006.01)

(52) U.S. Cl.
CPC ......... *G07G 1/0018* (2013.01); *G06F 1/1675* (2013.01); *G06F 1/1696* (2013.01); *G07G 1/009* (2013.01)

(58) Field of Classification Search
CPC .......... G07G 1/0018; G07G 1/12; G07G 5/00; G07F 7/0873; G07F 7/088; G06Q 20/209; G06F 1/1675; G06F 1/1696
USPC ............................ 235/1 R, 1 D, 383, 472.01
See application file for complete search history.

(56) References Cited

FOREIGN PATENT DOCUMENTS

JP 2020119349 A * 8/2020

OTHER PUBLICATIONS

Machine translation of JP 2020119349, retrieved Jan. 20, 2026 (Year: 2026).*

* cited by examiner

*Primary Examiner* — Suezu Ellis

(57) ABSTRACT

A device housing of a mobile point-of-sale (POS) terminal is provided. The device housing includes a base, a sliding cover and a liftable cover assembly. The base includes a first accommodation member and a second accommodation member, and the liftable cover assembly is connected to the first accommodation member. A first side protrusion with a first through hole and a second side protrusion with a second through hole are formed on the left and right sides of the first accommodation member respectively. A first block is connected to the bottom surface of the first side protrusion, and a second block is connected to the bottom surface of the second side protrusion. The liftable cover assembly has a left snap-fit member for snap-fitting the first block and a right snap-fit member for snap-fitting the second block.

15 Claims, 10 Drawing Sheets

DEVICE HOUSING OF MOBILE POS TERMINAL

TECHNICAL FIELD

The present invention relates to the technical field of mobile POS terminals, particularly to a device housing of a mobile POS terminal.

BACKGROUND

With technological advancements, smartphones have become one of the essential items in people's daily lives, and enhances user convenience by integrating numerous specialized functions, such as NFC mobile payments, navigation, and physiological measurement recording.

FIGS. 1A and 1B are the first and second perspective views of a conventional mobile POS terminal. As shown in FIGS. 1A and 1B, when using NFC mobile payment, the user first holds his smartphone close to a card reader 11*a* of the mobile POS terminal 1*a*. Then, after fingerprint or facial recognition by the user, an NFC mobile payment transaction is completed.

Furthermore, FIG. 2 is a third perspective view of the conventional mobile POS terminal. As shown in FIGS. 1B and 2, the housing 10*a* of the mobile POS terminal 1*a* contains a roll of thermal sensitive paper and a thermal printer, with the housing 10*a* featuring an opening 101*a*. With this design, after completing an NFC mobile payment transaction, the thermal printer prints the transaction details on a section of thermal sensitive paper and delivers this section of thermal sensitive paper out of the housing 10*a* through the opening 101*a*. The staff then tears off this section of thermal sensitive paper as a receipt for the user to keep.

As shown in FIGS. 1B and 2, the housing 10*a* includes a compartment designed to house the thermal printer and the roll of thermal sensitive paper, with a liftable cover 12*a* attached to the housing 10*a* to enclose the compartment. Additionally, the opening 101*a* has a first long edge, a second long edge, a first short edge, and a second short edge, with a paper cutter positioned near the first long edge inside the compartment.

Typically, the staff pulls the section of thermal sensitive paper upward and backward to bring one side of the section of thermal sensitive paper into contact with the paper cutter, thereby cutting it. This method allows the staff to easily and successfully tear off the section of thermal sensitive paper as the receipt for the user. However, practical experience shows that when the staff pulls the thermal sensitive paper upward and backward, the liftable cover 12*a* may lift slightly due to the paper's movement, preventing the paper cutter from making a clean cut.

In summary, the existing housing structure of mobile POS terminals clearly still has room for improvement. Therefore, the inventors of the present invention have diligently researched and developed, ultimately creating the device housing of a mobile POS terminal as described herein.

SUMMARY

The primary objective of the present invention is to provide a device housing of a mobile POS terminal, which comprises: a base, a sliding cover, and a liftable cover assembly. The base is equipped with a first accommodation member and a second accommodation member. The sliding cover is assembled to the second accommodation member, while the liftable cover assembly is pivotally assembled to the first accommodation member. Particularly, the left and right sides of the first accommodation member extend to form a first side protrusion with a first through hole and a second side protrusion with a second through hole, respectively. The bottom surface of the first side protrusion is provided with a first block, and the bottom surface of the second side protrusion is provided with a second block. Additionally, the liftable cover assembly includes a left snap-fit member and a right snap-fit member. The left snap-fit member passes through the first through hole and is preset to engage the first block, while the right snap-fit member passes through the second through hole and is preset to engage the second block. By this design, the liftable cover assembly is protected from cocking in case of being subject to upward or backward thrust forces.

Specifically, the first accommodation member is used to house a roll of thermal sensitive paper and a thermal printer, with a paper outlet located between the liftable cover assembly and the base. During normal operations, the thermal printer is controlled to print transaction details on a section of thermal sensitive paper, which is then fed outward through the paper outlet. If this section of paper is pulled upward or backward, pushing the liftable cover assembly upward, the cover is prevented from cocking because the left snap-fit member snap-fits the first block and the right snap-fit member snap-fit the second block.

To achieve the aforementioned object, the present invention proposes an embodiment of the device housing of a mobile POS terminal, which comprises:

- a base provided with a first accommodation member having a first opening and a second accommodation member having a second opening, wherein the left and right sides of the first accommodation member respectively extend to form a first side protrusion with a first through hole and a second side protrusion with a second through hole, a bottom surface of the first side protrusion is provided with a first block adjacent to the first through hole, and a bottom surface of the second side protrusion is provided with a second block adjacent to the second through hole;
- a sliding cover assembled to the second accommodation member to cover the second opening; and
- a liftable cover assembly pivotally assembled to the first accommodation member to cover the first opening, and comprising:
- a first cover member, pivotally assembled to the first accommodation member, and having a top opening and an edge notch;
- a mounting plate assembled to an inner surface of the first cover member, wherein the mounting plate has a left snap-fit member and a right snap-fit member extending downward, the left snap-fit member passes through the first through hole and defaultedly snap-fits the first block, and the right snap-fit member passes through the second through hole and defaultedly snap-fits with the second block; and
- a second cover member, pivotally assembled to the mounting plate and located within the top opening;
- wherein when the liftable cover assembly covers the first opening, the edge notch and the base jointly enclose to form a paper output port.

In an embodiment, the base comprises:

- a base unit, comprising:
- a first substrate having a first long side, a second long side, a first short side, and a second short side;
- a first left side plate connected to the first long side;

a first right side plate connected to the second long side;
a first front side plate connected to the first short side;
a first rear side plate connected to the second short side, the first left side plate, and the first right side plate;
a left arc-shaped protrusion, formed on the first left side plate and simultaneously connected to the first front side plate;
a right arc-shaped protrusion, formed on the first right side plate and simultaneously connected to the first front side plate; and
a front protrusion formed on the first front side plate;
the first accommodation member, disposed on the first substrate, with a first flange formed on a front side thereof;
the second accommodation member, disposed on the first substrate, and comprising:
a second substrate, also having a first long side, a second long side, a first short side, and a second short side, with a central recessed area;
a second left side plate connected to the first long side of the second substrate;
a second right side plate connected to the second long side of the second substrate;
a second front side plate connected to the first short side of the second substrate;
a second rear side plate connected to the second short side of the second substrate, the second left side plate, and the second right side plate;
a left arc-shaped extension plate, extending from the second left side plate and simultaneously connected to the second front side plate;
a right arc-shaped extension plate, extending from the second right side plate and simultaneously connected to the second front side plate;
a second flange, formed on the second front side plate, and simultaneously connected to the left arc-shaped extension plate and the right arc-shaped extension plate; and
a first pivoting mechanism formed on the second flange;
wherein the first flange abuts forward against the front protrusion, the first side protrusion abuts leftward against the left arc-shaped protrusion, and the second side protrusion abuts rightward against the right arc-shaped protrusion;
wherein the second left side plate abuts downward against the first left side plate, the second right side plate abuts downward against the first right side plate, the second rear side plate abuts downward against the first rear side plate, the second flange abuts forward against the rear side edge of the first accommodation member, the left arc-shaped extension plate abuts downward against the left arc-shaped protrusion, and the right arc-shaped extension plate abuts downward against the right arc-shaped protrusion.

In an embodiment, the second accommodation member has an upper accommodation area and a lower accommodation area, the central recessed area being the upper accommodation area, and an outer bottom surface of the central recessed area, the second left side plate, the second right side plate, and the second rear side plate enclose to form the lower accommodation area.

In an embodiment, the first rear side plate is provided with a first slot, and the second rear side plate is provided with a second slot communicating with the lower accommodation area.

In an embodiment, the first cover member comprises:
a first arc-shaped plate, provided with the top opening, having a first edge, a second edge, a third edge, and a fourth edge, and having a concave surface and a convex surface;
a third left side plate connected to the first edge;
a third right side plate connected to the second edge;
a third front side plate, connected to the third edge, the third left side plate, and the third right side plate, and provided with the edge notch;
a second pivoting mechanism, formed on the fourth edge, and pivotally connected to the first pivoting mechanism;
a first left snap fastener, formed on the concave surface of the first arc-shaped plate and adjacent to a left rim of the top opening;
a first right snap fastener, formed on the concave surface of the first arc-shaped plate, adjacent to a right rim of the top opening, and spaced apart from the first left snap fastener by a first distance;
a second left snap fastener, formed on the concave surface of the first arc-shaped plate and adjacent to a front rim of the top opening;
a second right snap fastener, formed on the concave surface of the first arc-shaped plate to face the second left snap fastener, adjacent to the front rim of the top opening, and spaced apart from the second left snap fastener by a second distance;
a first left cushion block, disposed on the convex surface of the first arc-shaped plate and adjacent to a rear rim of the top opening;
a first right cushion block, disposed on the convex surface of the first arc-shaped plate, adjacent to the rear rim of the top opening, and spaced apart from the first left cushion block by a third distance; and
an inclined recess, formed on the convex surface of the first arc-shaped plate and intersecting with the front rim of the top opening;
wherein, the front protrusion, the edge notch, the third left side plate and the third right side plate jointly enclose to form the paper output port.

In an embodiment, the mounting plate comprises:
a substrate provided with a first notch, a second notch, a third notch, and a fourth notch;
the left snap-fit member extending downward from a bottom surface of the substrate;
the right snap-fit member, extending downward from the bottom surface of the substrate and being spaced apart from the left snap-fit member by a third distance;
a first short rod disposed within the first notch;
a second short rod disposed within the second notch;
a third short rod disposed within the third notch; and
a fourth short rod disposed within the fourth notch.

In an embodiment, the first left snap fastener has a first socket to engage the first short rod, and the first right snap fastener has a second socket to engage the second short rod.

In an embodiment, the first short rod has a first axis, and the second short rod has a second axis that is coaxial with the first axis.

In an embodiment, the second cover member comprises:
a second arc-shaped plate also having a first edge, a second edge, a third edge, and a fourth edge, wherein the first edge, the second edge, the third edge, and the fourth edge are respectively adjacent to the left rim, the right rim, the front rim, and the rear rim of the top opening, and the second arc-shaped plate also has a concave surface and a convex surface;

- a third left snap fastener formed on the concave surface of the second arc-shaped plate;
- a third right snap fastener formed on the concave surface of the second arc-shaped plate; and
- at least one abutment plate formed on the concave surface of the second arc-shaped plate and extending to protrude from the fourth edge of the second arc-shaped plate.

In an embodiment, the liftable cover assembly further comprises:

- a rod, comprising:
- a first rod member;
- a fifth short rod connected to one end of the first rod member; and
- a sixth short rod connected to the other end of the first rod member;
- a block having a top surface, a front surface, a bottom surface, a rear surface, a left surface, and a right surface, with an arc-shaped concave part formed on the front surface to engage the first rod member; and
- at least one compression spring sandwiched between the top surface and the bottom surface of the substrate;
- wherein the rear surface is an inwardly curved surface.

In an embodiment, the second left snap fastener has a third engagement port to engage the fifth short rod, and the second right snap fastener has a fourth engagement port to engage the sixth short rod.

In an embodiment, the third left snap fastener has a fifth engagement port to engage the third short rod, and the third right snap fastener has a sixth engagement port to engage the fourth short rod.

In an embodiment, the third short rod has a third axis, and the fourth short rod has a fourth axis that is coaxial with the third axis.

In an embodiment, the third axis is not coaxial with the first axis.

In an embodiment, the top surface of the cover is provided with a second left cushion block and a second right cushion block.

BRIEF DESCRIPTION OF DRAWINGS

By supplementing the detailed description of exemplary embodiments in the implementation with the drawings of the present invention, the usage and advantages of the present invention and its preferred embodiments will be better understood, wherein the drawings of the present invention include:

FIG. 4B is a second perspective exploded view of the device housing of a mobile POS terminal according to the present invention.

DESCRIPTION OF EMBODIMENTS

To enable the esteemed examination committee to further understand the structure, features, objectives, and advantages of the present invention, detailed descriptions with drawings and preferred embodiments are provided below.

Figure 1A:
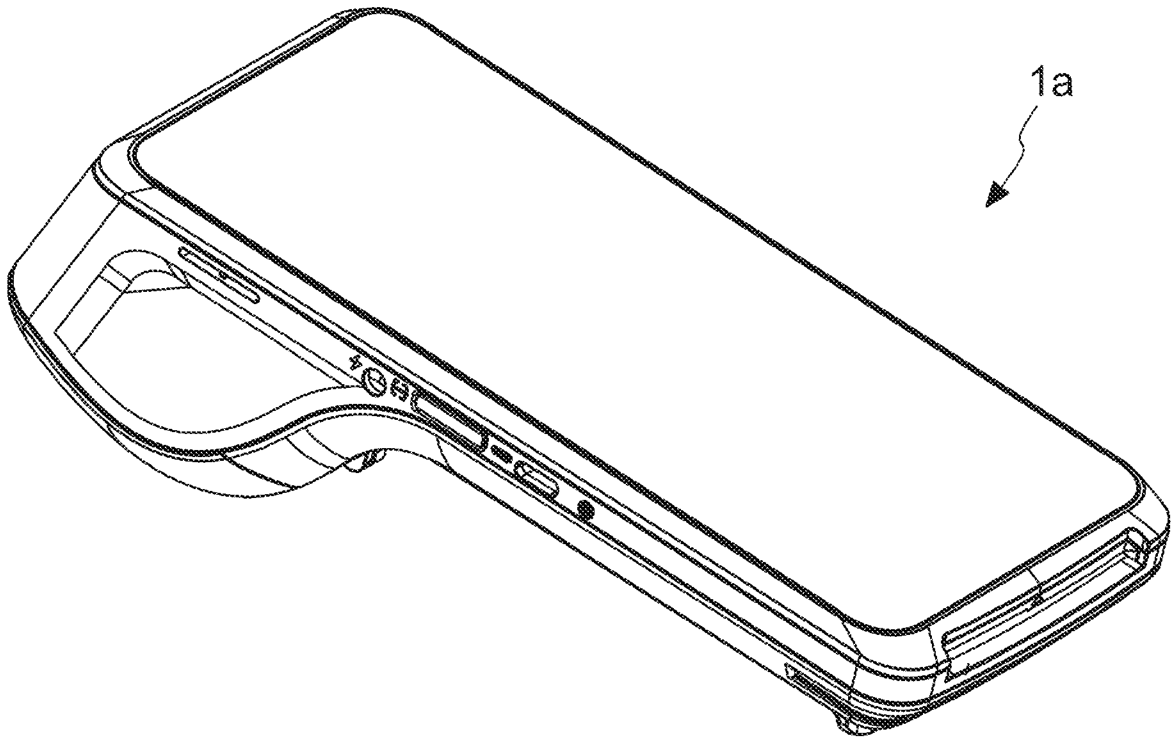
FIG. 1A (Prior art)
FIG. 1A is a first perspective view of a conventional mobile POS terminal.
Figure 1B:
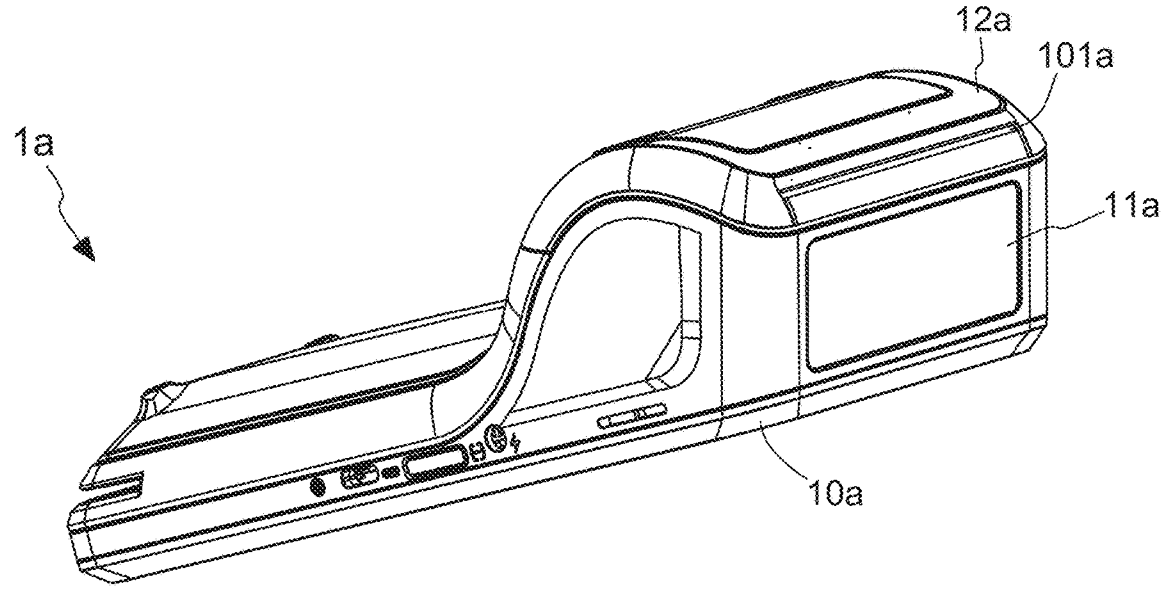
FIG. 1B (Prior art)
FIG. 1B is a second perspective view of the conventional mobile POS terminal.
Figure 2:
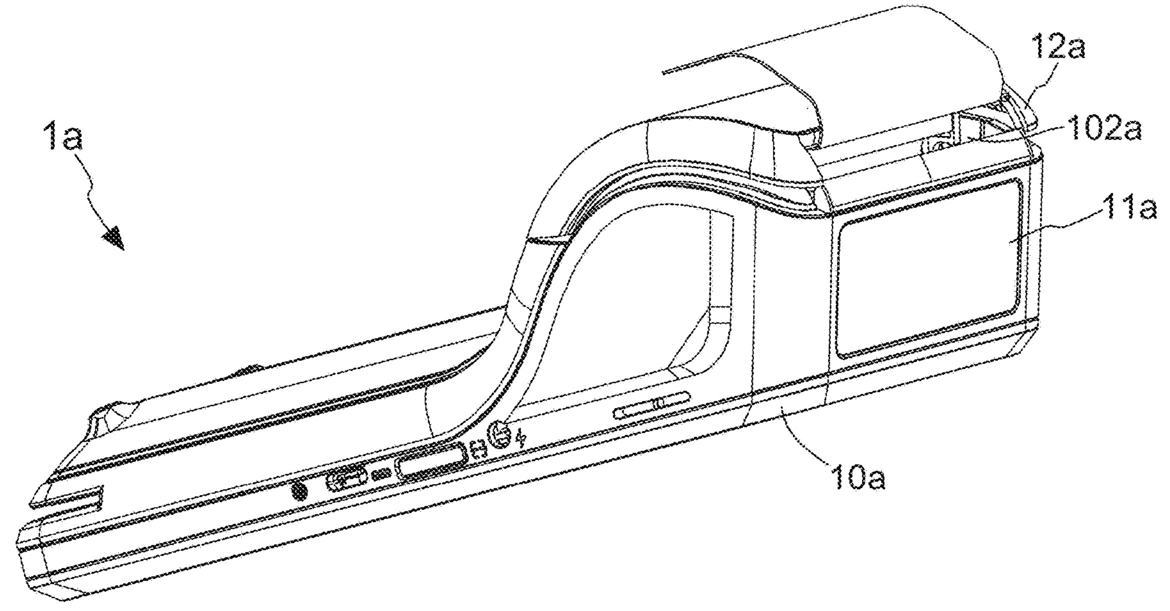
FIG. 2 (Prior art)
FIG. 2 is a second perspective view of the conventional mobile POS terminal.
Figure 3A:
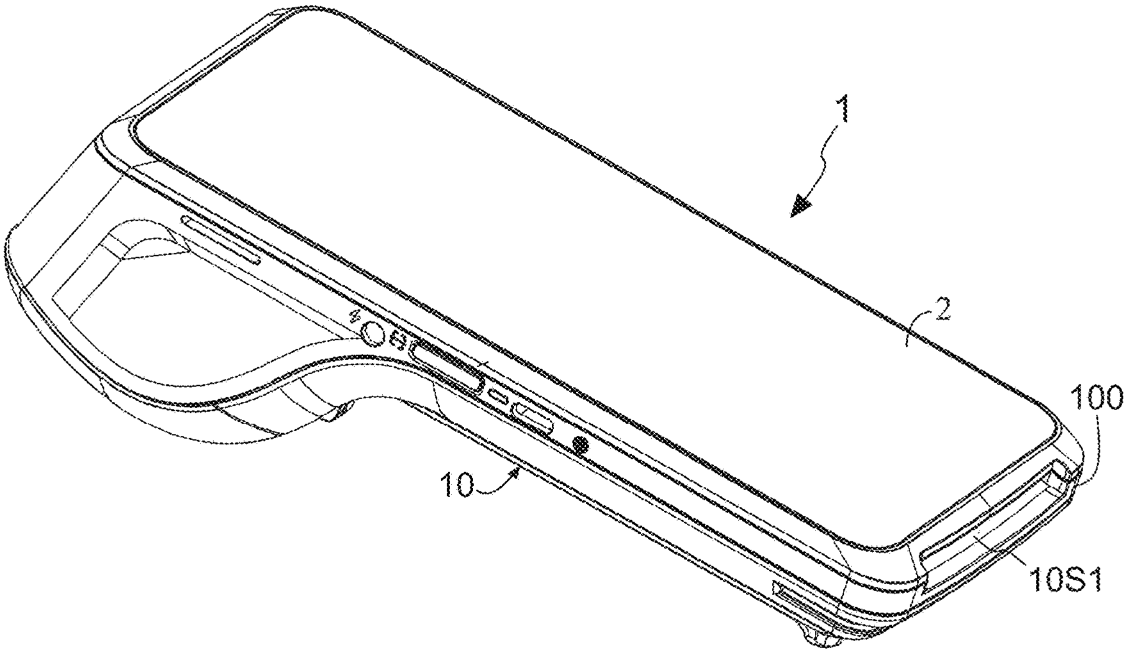
FIG. 3A is a first perspective view of a device housing of a mobile POS terminal according to the present invention.
Figure 3B:
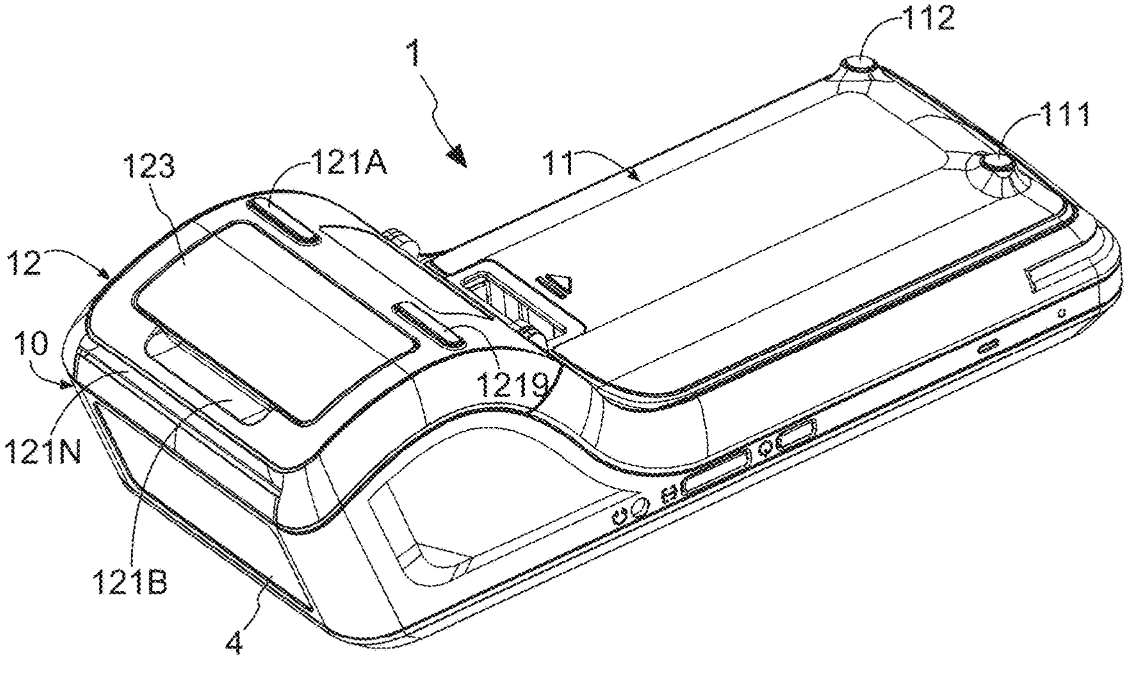
FIG. 3B is a second perspective view of the device housing of a mobile POS terminal according to the present invention.
Figure 4A:
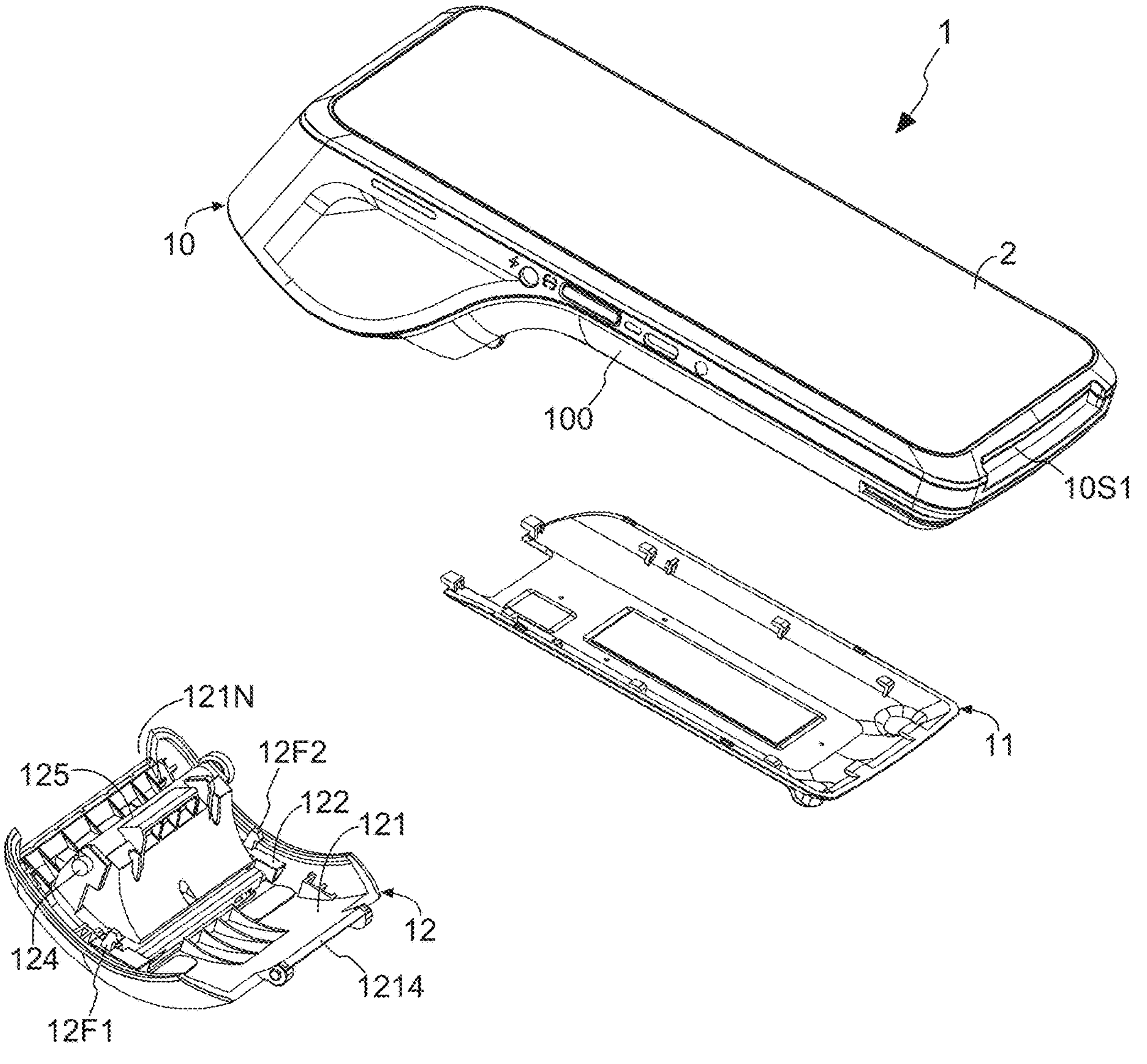
FIGS. 4A and 4B are first perspective exploded views of the device housing of a mobile POS terminal according to the present invention.
Figure 4B:
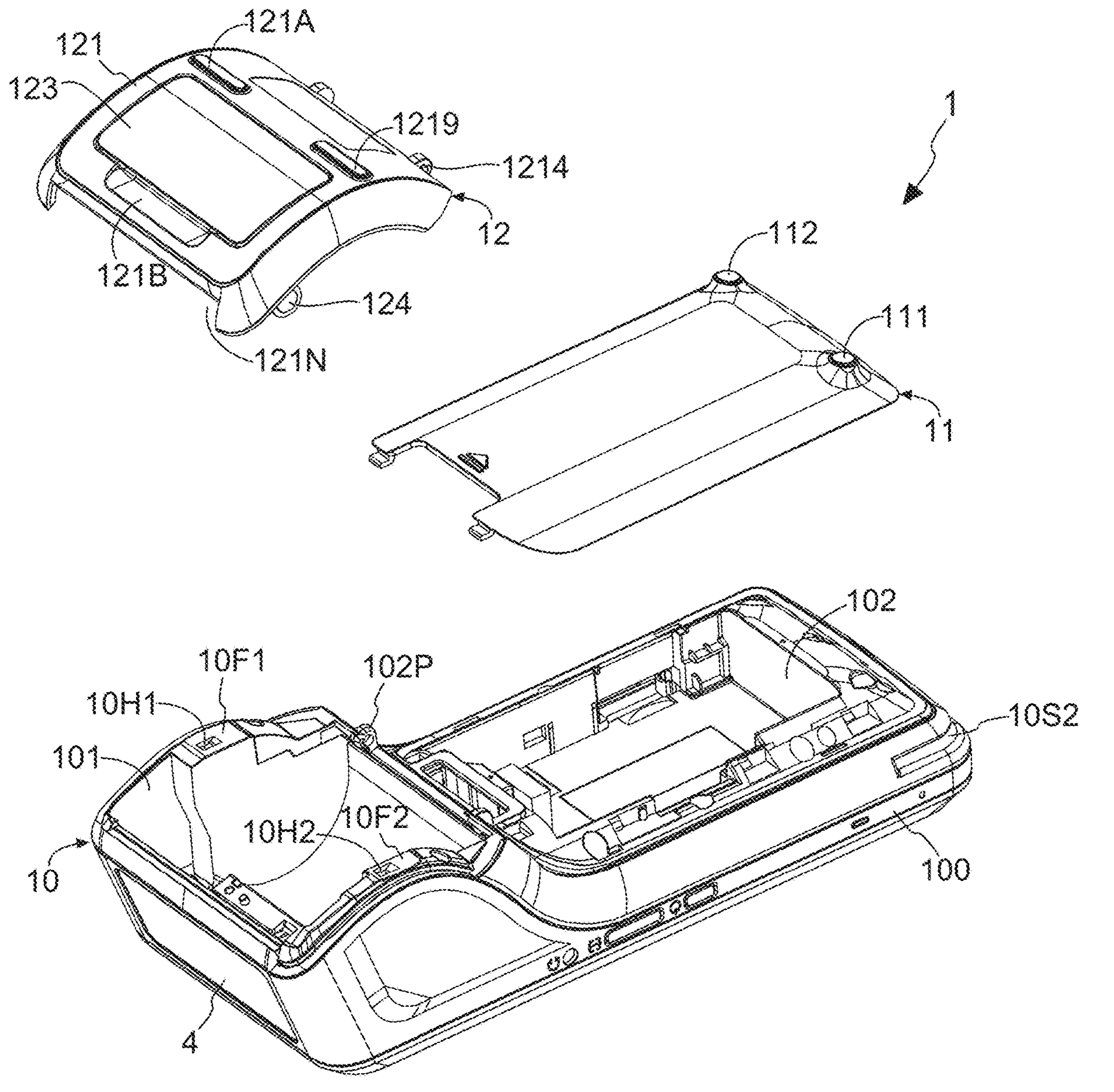

FIGS. 3A and 3B are first and second perspective views of the device housing of a mobile POS terminal according to the present invention, while FIGS. 4A and 4B are first and second perspective exploded views of the device housing of a mobile POS terminal according to the present invention. As shown in FIGS. 3A, 3B, 4A, and 4B, the device housing 1 of a mobile POS terminal according to the present invention mainly includes: a base 10, a sliding cover 11, and a liftable cover assembly 12.

Figure 5A:
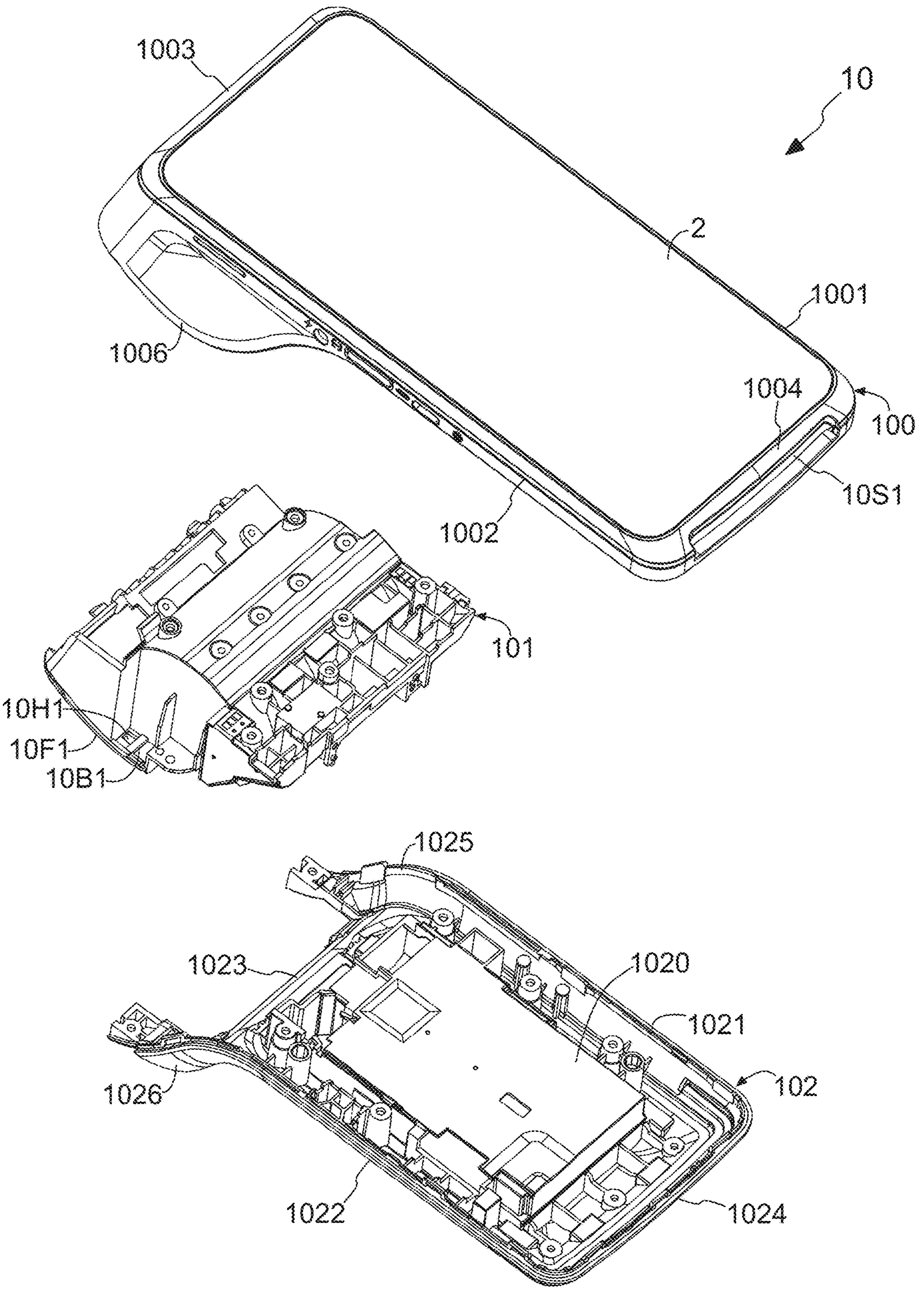
FIG. 5A is a perspective exploded view of the base shown in FIG. 4A.
Figure 5B:
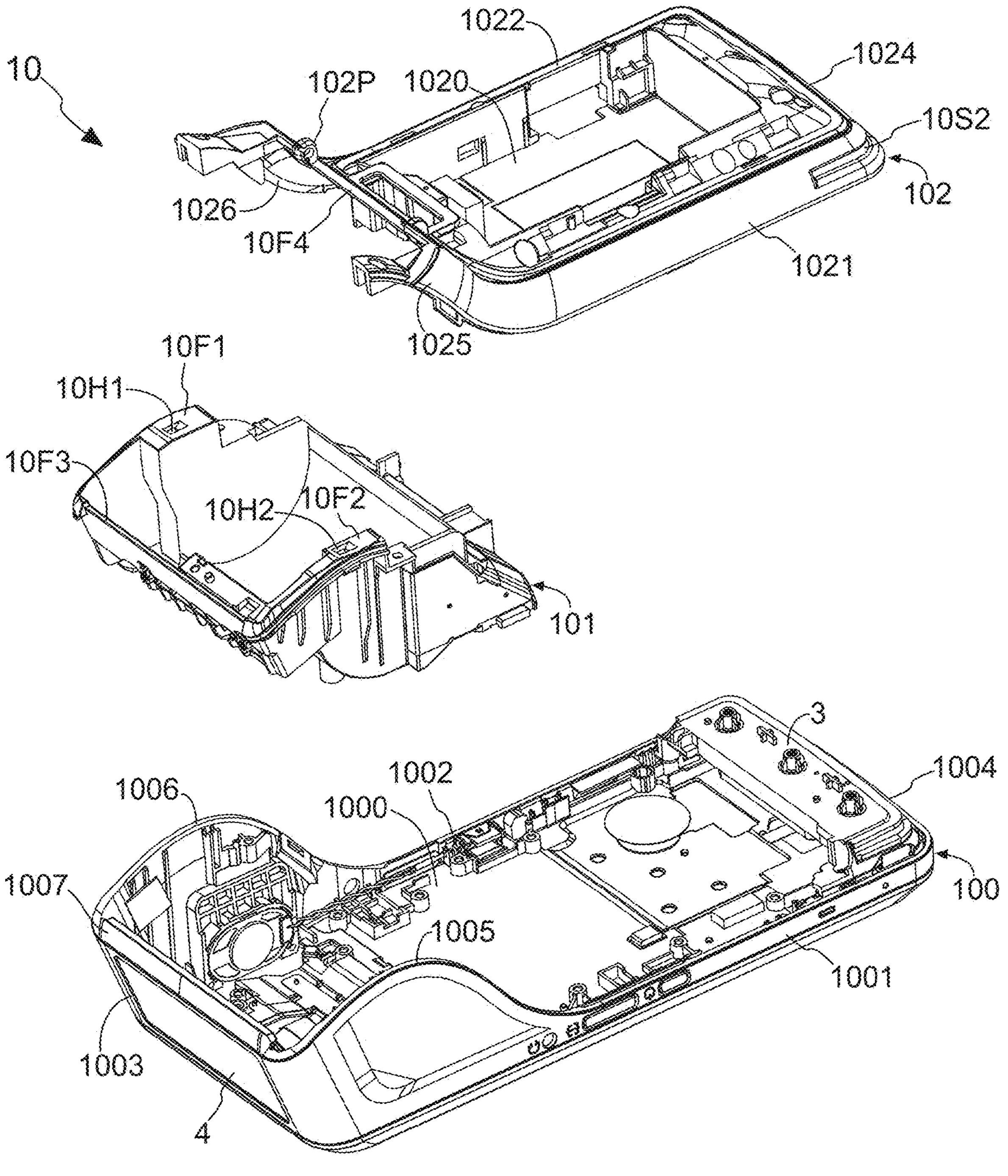
FIG. 5B is a perspective exploded view of the base shown in FIG. 4B.

Furthermore, FIG. 5A is an exploded perspective view of the base 10 shown in FIG. 4A, and FIG. 5B is an exploded perspective view of the base 10 shown in FIG. 4B. According to the present invention, the base 10 includes a base unit 100, a first accommodation member 101, and a second accommodation member 102. The base unit 100 is composed of a first substrate 1000, a first left side plate 1001, a first right side plate 1002, a first front side plate 1003, a first rear side plate 1004, a left arc-shaped protrusion 1005, a right arc-shaped protrusion 1006, and a front protrusion 1007. In more detail, the first substrate 1000 has a first long edge, a second long edge, a first short edge, and a second short edge. The first left side plate 1001 is connected to the first long edge, the first right side plate 1002 is connected to the second long edge, the first front side plate 1003 is connected to the first short edge, and the first rear side plate 1004 is connected to the second short edge, the first left side plate 1001, and the first right side plate 1002. Notably, the left arc-shaped protrusion 1005 is formed on the first left side plate 1001 and also connected to the first front side plate 1003. In contrast with the left arc-shaped protrusion 1005, the right arc-shaped protrusion 1006 is formed on the first right side plate 1002 and also connected to the first front side plate 1003. Additionally, the front protrusion 1007 is formed on the first front side plate 1003.

Figure 6A:
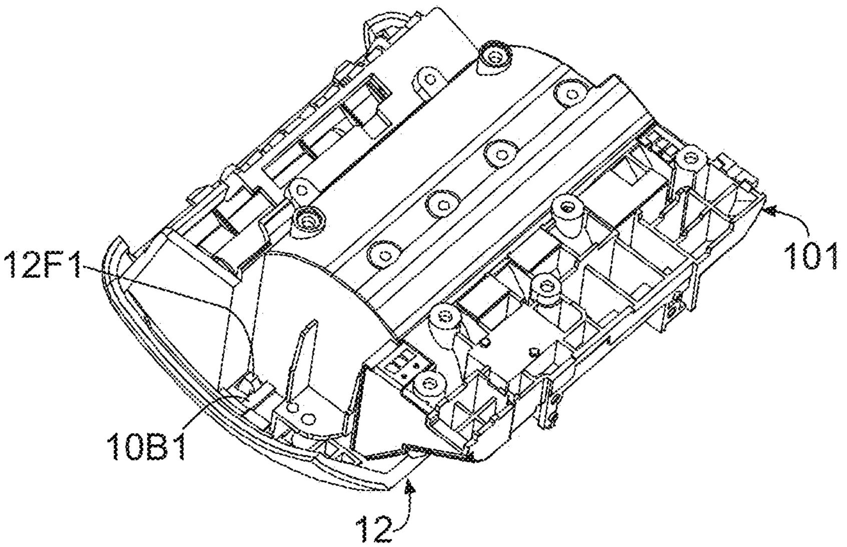
FIG. 6A is a first perspective view of the liftable cover assembly and the first accommodation member.
Figure 6B:
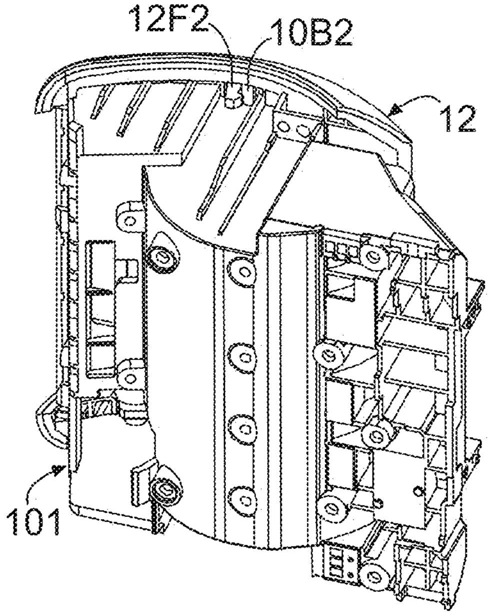
FIG. 6B is a second perspective view of the liftable cover assembly and the first accommodation member.

On the other hand, FIGS. 6A and 6B are the first and second perspective views of the liftable cover assembly 12 and the first accommodation member 101. As shown in FIGS. 5A, 5B, 6A, and 6B, the first accommodation member 101 is placed on the first substrate 1000 to accommodate a roll of thermal sensitive paper and a thermal printer. Specifically, the left and right sides of the first accommodation member 101 extend to form a first side protrusion 10 F1 with a first through hole 10H1 and a second side protrusion 10 F2 with a second through hole 10 H2. The bottom surface of the first side protrusion 10 F1 is provided with a first block 10B1 adjacent to the first through hole 10H1, and the bottom surface of the second side protrusion 10F2 is provided with a second block 10B2 adjacent to the second through hole 10H2. Moreover, the first accommodation member 101 has a first opening, and its front edge is formed with a first flange 10F3.

In more detail, the second accommodation member 102 is disposed above the first substrate 1000 and has a second opening. According to the present invention, the second accommodation member 102 consists of a second substrate 1020, a second left side plate 1021, a second right side plate 1022, a second front side plate 1023, a second rear side plate 1024, a left arc-shaped extension plate 1025, a right arc-shaped extension plate 1026, a second flange 10F4, and a first pivoting mechanism 102P. Specifically, the second substrate 1020 also has a first long edge, a second long edge, a first short edge, and a second short edge, and includes a central recessed area. Moreover, the second left side plate 1021, the second right side plate 1022, and the second front side plate 1023 are respectively connected to the first long edge, the second long edge, and the first short edge of the second substrate 1020. On the other hand, the second rear side plate 1024 is connected to the second short edge of the second substrate 1020, the second left side plate 1021, and the second right side plate 1022. Notably, the left arc-shaped extension plate 1025 extends from the second left side plate 1021 and is simultaneously connected to the second front side plate 1023. In contrast with the left arc-shaped extension plate 1025, the right arc-shaped extension plate 1026 extends from the second right side plate 1022 and is simultaneously connected to the second front side plate 1023.

As described above, the second flange 10F4 is formed on the second front side plate 1023 and simultaneously connects to the left arc-shaped extension plate 1025 and the right arc-shaped extension plate 1026. Additionally, the first pivoting mechanism 102P is formed on the second flange 10F4. As shown in FIGS. 4A, 4B, 5A, and 5B, the first flange 10F3 abuts forward against the front protrusion 1007, the first side protrusion 10F1 abuts leftward against the left arc-shaped protrusion 102, and the second side protrusion 10F2 abuts rightward against the right arc-shaped protrusion 103. On the other hand, the second left side plate 1021 abuts downward against the first left side plate 1001, the second right side plate 1022 abuts downward against the first right side plate 1002, the second rear side plate 1024 abuts downward against the first rear side plate 1004, the second flange 10F4 abuts forward against the rear edge of the first accommodation member 101, the left arc-shaped extension plate 1025 abuts downward against the left arc-shaped protrusion 1005, and the right arc-shaped extension plate 1026 abuts downward against the right arc-shaped protrusion 1006.

It is easy to understand that the second accommodation member 102 and the base unit 100 jointly accommodate a main circuit board (not shown), a magnetic card reading module 3, and a chip card reading module (not shown). The bottom surface of the first substrate 1000 of the base unit 100 is integrated with a touch display module 2. On the other hand, the first accommodation member 101 is used to accommodate a roll of thermal sensitive paper and a thermal printer, while an NFC card reading module 4 is embedded in the first front side plate 1003.

To supplement, the second accommodation member 102 has an upper accommodation area and a lower accommodation area. The central recessed area serves as the upper accommodation area, while the outer bottom surface of the central recessed area, the second left side plate 1021, the second right side plate 1022, and the second rear side plate 1024 enclose to form the lower accommodation area. Additionally, the first rear side plate 1004 is provided with a first slot 10S1, and the second rear side plate 1024 is provided with a second slot 10S2 communicating with the lower accommodation area. In other words, the magnetic card reading module 3 is installed in the first slot 10S1, and the second slot 10S2 allows a chip card to be inserted, enabling the chip card reading module to access the chip card.

Figure 7A:
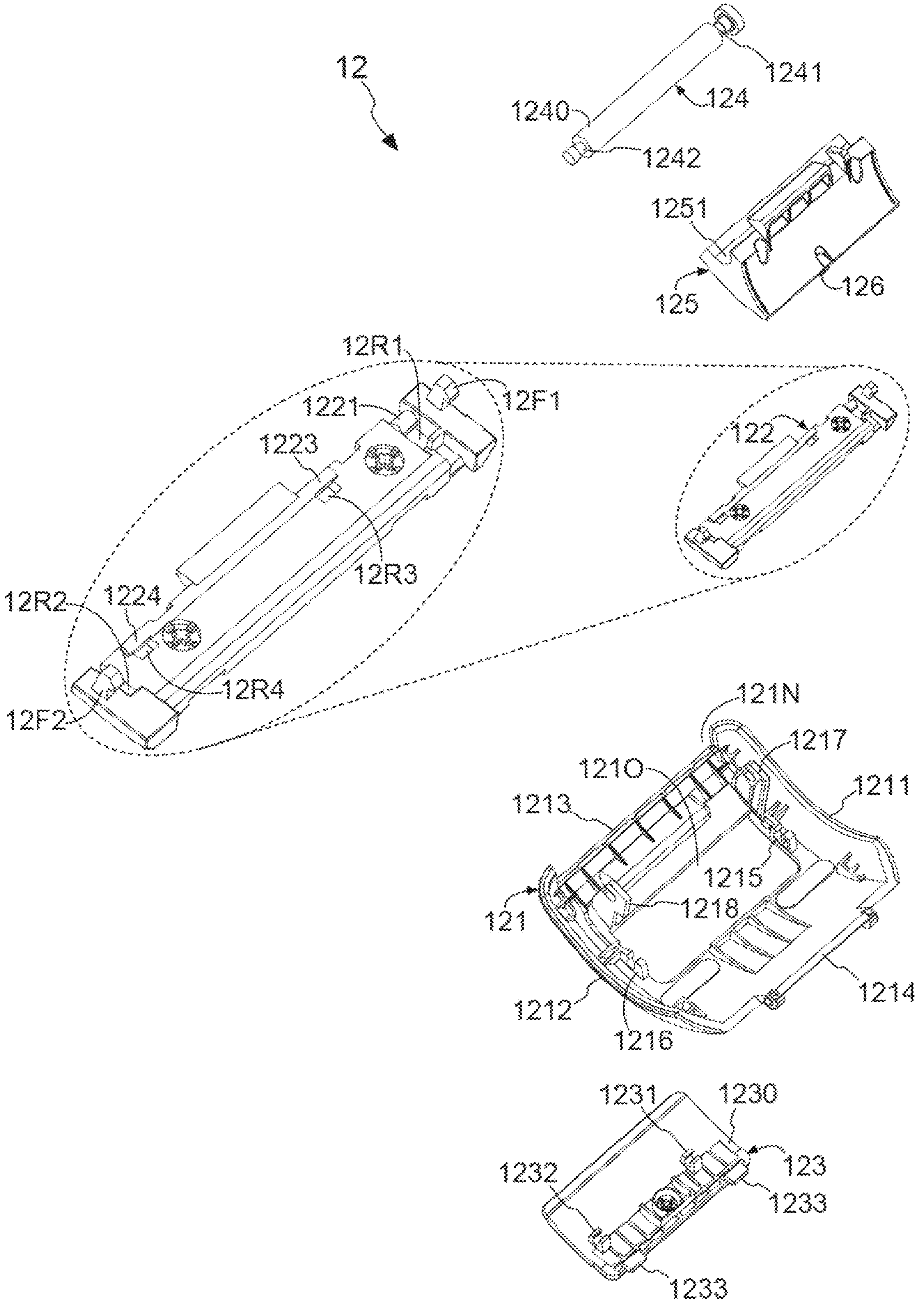
FIG. 7A is a perspective exploded view of the liftable cover assembly shown in FIG. 4A.
Figure 7B:
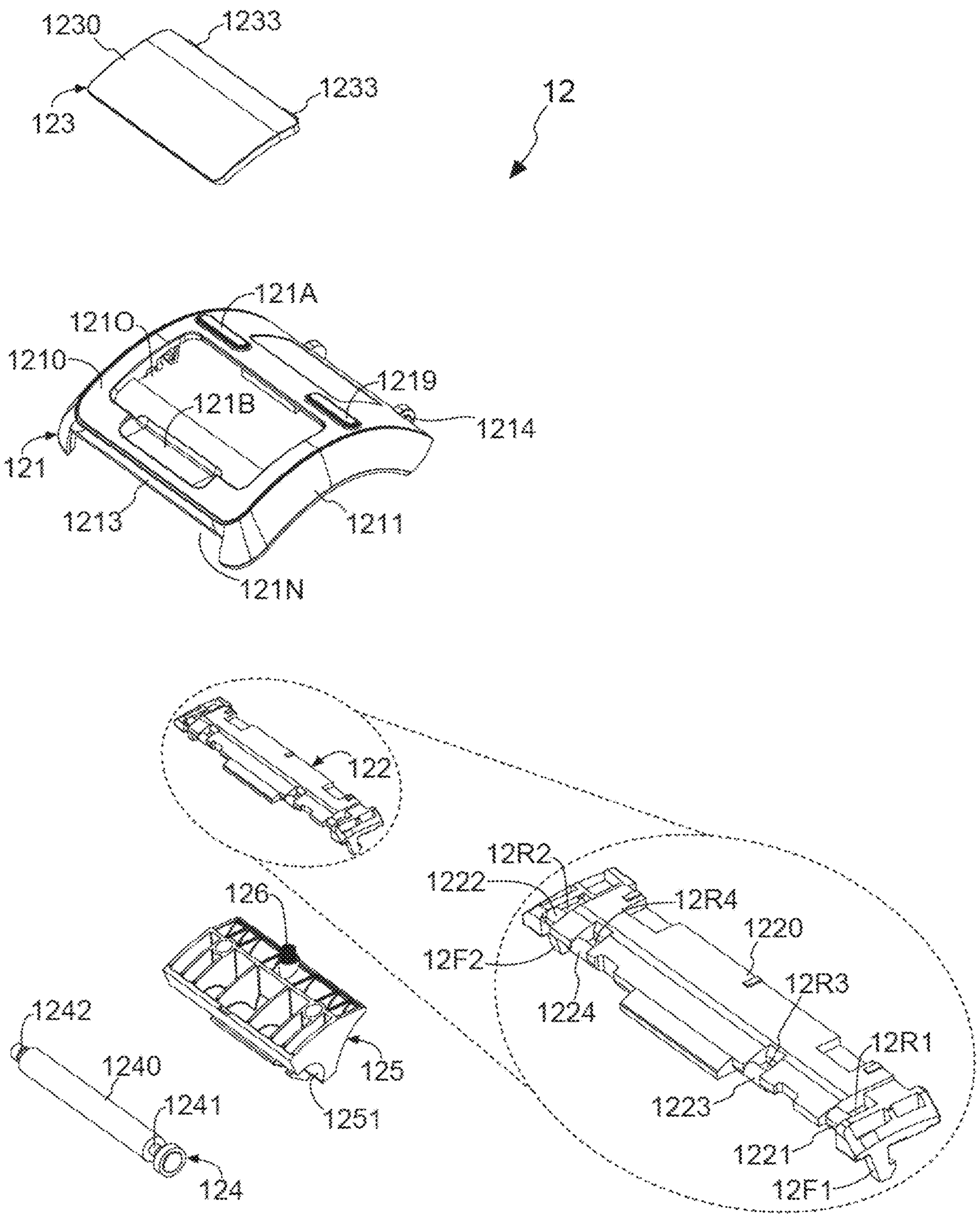
FIG. 7B is a perspective exploded view of the liftable cover assembly shown in FIG. 4B.

Furthermore, FIG. 7A is an exploded view of the liftable cover assembly 12 shown in FIG. 4A, and FIG. 7B is an exploded view of the liftable cover assembly 12 shown in FIG. 4B. As shown in FIGS. 4A, 4B, 5A, 5A, 7A, and 7B, the liftable cover assembly 12 is pivotally assembled to the first accommodation member 101 to cover the first opening and includes: a first cover member 121, a mounting plate 122, a second cover member 123, a rod 124, a block 125, and at least one compression spring 126. Specifically, the first cover member 121 is pivotally assembled to the first accommodation member 101 and consists of a first arc-shaped plate 1210, a third left side plate 1211, a third right side plate 1212, and a third front side plate 1213. In detail, the first arc-shaped plate 1210 is provided with a top opening 1210 and has a first edge, a second edge, a third edge, a fourth edge, a concave surface, and a convex surface. More specifically, the third left side plate 1211 is connected to the first edge, the third right side plate 1212 is connected to the second edge, and the third front side plate 1213 is connected to the third edge, the third left side plate 1211, and the third right side plate 1212. On the other hand, the third front side plate 1213 is provided with an edge notch 121N. Additionally, a second pivoting mechanism 1214 is formed on the fourth edge and is pivotally connected to the first pivoting mechanism 102P.

According to the present invention, the concave surface of the first arc-shaped plate 1210 is provided with a first left snap fastener 1215, a first right snap fastener 1216, a second left snap fastener 1217, and a second right snap fastener 1218. Among these, the first left snap fastener 1215 is adjacent to the left rim of the top opening 1210, while the first right snap fastener 1216 is adjacent to the right rim of the top opening 1210 and spaced apart from the first left snap fastener 1215 by a first distance. On the other hand, the second left snap fastener 1217 is adjacent to the front rim of the top opening 1210, and the second right snap fastener 1218 is adjacent to the front rim of the top opening 1210 and spaced apart from the second left snap fastener 1217 by a second distance.

FIGS. 3B, 4B, and 6B also illustrate that the convex surface of the first arc-shaped plate 1210 is provided with a first left cushion block 1219, a first right cushion block 121A, and an inclined recess 121B. Here, the first left cushion block 1219 is adjacent to the rear rim of the top opening 1210, while the inclined recess 121B intersects with the front rim of the top opening 1210. Additionally, the first right cushion block 121A is adjacent to the rear rim of the top opening 1210 and spaced apart from the first left cushion block 1219 by a third distance. Notably, when the liftable cover assembly 12 covers the first opening, the front protrusion 1007, the edge notch 121 N, the third left side plate 1211, and the third right side plate 1212 collectively enclose to form a paper output port. It is easy to understand that during normal operation, the thermal-sensitive printer is controlled to print transaction details on a piece of thermal-sensitive paper and then eject the paper through the paper output port.

Furthermore, in the liftable cover assembly 12, the mounting plate 122 includes: a base plate 1220, a left snap-fit member 12F1, a right snap-fit member 12F2, a first short rod 1221, a second short rod 1222, a third short rod 1223, and a fourth short rod 1224. The base plate 1220 is provided with a first notch 12R1, a second notch 12R2, a third notch 12R3, and a fourth notch 12R4. The first short rod 1221 is disposed in the first notch 12R1, the second short rod 1222 is disposed in the second notch 12R2, the third short rod 1223 is disposed in the third notch 12R3, and the fourth short rod 1224 is disposed in the fourth notch 12R4. Additionally, the left snap-fit member 12F1 extends downward from the bottom surface of the base plate 1220, and the right snap-fit member 12F2 extends downward from the bottom surface of the base plate 1220 and is spaced apart from the left snap-fit member 12F1 by a third distance.

According to the present invention, the mounting plate 122 is assembled to the inner surface of the first cover member 121. The left snap-fit member 12F1 passes through the first through hole 10H1 and defaultedly snap-fits the first block 10B1, while the right snap-fit member 12 F2 passes through the second through hole 10 H2 and defaultedly snap-fits the second block 10B2. Moreover, the first left snap fastener 1215 has a first engagement slot to engage the first short rod 1221, and the first right snap fastener 1216 has a second engagement slot to engage the second short rod 1222. With this design, after the section of thermal sensitive paper is delivered out of the paper output port, if the section of thermal sensitive paper is pulled upward or backward, thereby pushing the liftable cover assembly 12 upward, the liftable cover assembly 12 is protected from cocking because the left snap-fit member 12F1 snap-fits the first block 12B1 and the right snap-fit member 12F2 snap-fits the second block 12B2.

On the other hand, the second cover member 123 is pivotally assembled to the mounting plate 122 and located within the top opening 1210. Specifically, the second cover member 123 includes: a second arc-shaped plate 1230, a third left snap fastener 1231, a third right snap fastener 1232, and at least one abutment plate 1233. The second arc-shaped plate 1230 similarly has a first edge, a second edge, a third edge, and a fourth edge. More specifically, the first edge, the second edge, the third edge, and the fourth edge are respectively adjacent to the left rim, right rim, front rim, and rear rim of the top opening 1210. The second arc-shaped plate 1230 similarly has a concave surface and a convex surface. As shown in FIGS. 7A and 7B, the third left snap fastener 1231 is formed on the concave surface of the second arc-shaped plate 1230, the third right snap fastener 1232 is formed on the concave surface of the second arc-shaped plate 1230, and at least one abutment plate 1233 is formed on the concave surface of the second arc-shaped plate 1230, extending beyond the fourth edge of the second arc-shaped plate 1230.

As shown in FIGS. 7A and 7B, the rod 124 includes a first rod member 1240, a fifth short rod 1241, and a sixth short rod 1242. The fifth short rod 1241 is connected to one end of the first rod member 1240, and the sixth short rod 1242 is connected to the other end of the first rod member 1240. Furthermore, the block 125 has a top surface, a front surface, a bottom surface, a rear surface, a left surface, and a right surface. Notably, the rear surface is a concave arc surface, and an arc-shaped concave part 1251 is formed on the front surface to engage with the first rod member 1240. On the other hand, the at least one compression spring 126 is clamped between the top surface and the bottom surface of the base plate 1220.

As shown in FIGS. 7A and 7B, the second left snap fastener 1217 has a third engagement port to engage with the fifth short rod 1241, and the second right snap fastener 1218 has a fourth engagement port to engage with the sixth short rod 1242. Additionally, the third left snap fastener 1231 has a fifth engagement port to engage with the third short rod 1223, and the third right snap fastener 1232 has a sixth engagement port to engage with the fourth short rod 1224.

According to the present invention, the third short rod 1223 has a third axis, the fourth short rod 1224 has a fourth axis, and the third axis is coaxial with the fourth axis. Moreover, the third axis is not coaxial with the first axis. With this design, as shown in FIGS. 3B, 4A, 6A, 6B, 7A, and 7B, the user's finger can extend into the gap between the inclined recess 121B and the second cover member 123, lifting the second cover member 123, thereby causing the mounting plate 122 to rotate slightly by an angle to release the left snap-fit member 12F1 from the first block 10B1 and simultaneously release the right snap-fit member 12F2 from the second block 10B2. Subsequently, the user can pull the second cover member 123 backward and upward, thereby allowing the first accommodation member 101 to expose the base 10. At this point, the user can remove the roll from the first accommodation member 101 and place a new roll of thermal sensitive paper inside the first accommodation member 101.

Additionally, as shown in FIGS. 3A, 3B, 4A, and 4B, the sliding cover 11 is assembled to the second accommodation member 102 to cover the second opening. Furthermore, the top surface of the upper cover 11 is provided with a second left cushion block 111 and a second right cushion block 112.

In summary, the device housing of a mobile POS terminal in the present invention has been fully and clearly described. However, it must be emphasized that the foregoing invention represents preferred embodiments, and any partial modifications or adaptations derived from the technical concept of the present invention that are readily conceivable by those skilled in the art shall fall within the scope of the patent rights of the present invention.

What is claimed is:

1. A device housing of a mobile point-of-sale (POS) terminal, comprising:

a base (10) provided with a first accommodation member (101) having a first opening and a second accommodation member (102) having a second opening, wherein a left side and a right side of the first accommodation member (101) respectively extend to form a first side protrusion (10F1) with a first through hole (10H1) and a second side protrusion (10F2) with a second through hole (10H2), a bottom surface of the first side protrusion (10F1) is provided with a first block (10B1) adjacent to the first through hole (10H1), and a bottom surface of the second side protrusion (10F2) is provided with a second block (10B2) adjacent to the second through hole (10H2);

a sliding cover (11) assembled to the second accommodation member (102) to cover the second opening; and a liftable cover assembly (12) pivotally assembled to the first accommodation member (101) to cover the first opening, and comprising:

a first cover member (121), pivotally assembled to the first accommodation member (101), and having a top opening (1210) and an edge notch (121N);

a mounting plate (122) assembled to an inner surface of the first cover member (121), wherein the mounting plate (122) has a left snap-fit member (12F1) and a right snap-fit member (12F2) extending downward, the left snap-fit member (12F1) passes through the first through hole (10H1) and defaultedly snap-fits the first block (10B1), and the right snap-fit member (12F2) passes through the second through hole (10H2) and defaultedly snap-fits with the second block (10B2); and a second cover member (123), pivotally assembled to the mounting plate (122) and located within the top opening (1210);

wherein when the liftable cover assembly (12) covers the first opening, the edge notch (121N) and the base (10) jointly enclose to form a paper output port.

2. The device housing for the mobile POS terminal according to claim 1, wherein the base (10) comprises:

a base unit (100), comprising:

a first substrate (1000) having a first long side, a second long side, a first short side, and a second short side;

a first left side plate (1001) connected to the first long side;

a first right side plate (1002) connected to the second long side;

a first front side plate (1003) connected to the first short side;

a first rear side plate (1004) connected to the second short side, the first left side plate (1001), and the first right side plate (1002);

a left arc-shaped protrusion (1005), formed on the first left side plate (1001) and simultaneously connected to the first front side plate (1003);

a right arc-shaped protrusion (1006), formed on the first right side plate (1002) and simultaneously connected to the first front side plate (1003); and a front protrusion (1007) formed on the first front side plate (1003);

the first accommodation member (101), disposed on the first substrate (1000), with a first flange (10F3) formed on a front side thereof;

the second accommodation member (102), disposed on the first substrate (1000), and comprising:

a second substrate (1020), also having a first long side, a second long side, a first short side, and a second short side, with a central recessed area;

a second left side plate (1021) connected to the first long side of the second substrate (1020);

a second right side plate (1022) connected to the second long side of the second substrate (1020);

a second front side plate (1023) connected to the first short side of the second substrate (1020);

a second rear side plate (1024) connected to the second short side of the second substrate (1020), the second left side plate (1021), and the second right side plate (1022);

a left arc-shaped extension plate (1025), extending from the second left side plate (1021) and simultaneously connected to the second front side plate (1023);

a right arc-shaped extension plate (1026), extending from the second right side plate (1022) and simultaneously connected to the second front side plate (1023);

a second flange (10F4), formed on the second front side plate (1023), and simultaneously connected to the left arc-shaped extension plate (1025) and the right arc-shaped extension plate (1026); and a first pivoting mechanism (102P) formed on the second flange (10F4);

wherein the first flange (10F3) abuts forward against the front protrusion (1007), the first side protrusion (10F1) abuts leftward against the left arc-shaped protrusion (102), and the second side protrusion (10F2) abuts rightward against the right arc-shaped protrusion (103);

wherein the second left side plate (1021) abuts downward against the first left side plate (1001), the second right side plate (1022) abuts downward against the first right side plate (1002), the second rear side plate (1024) abuts downward against the first rear side plate (1004), the second flange (10F4) abuts forward against the rear side edge of the first accommodation member (101), the left arc-shaped extension plate (1025) abuts downward against the left arc-shaped protrusion (1005), and the right arc-shaped extension plate (1026) abuts downward against the right arc-shaped protrusion (1006).

3. The device housing of a mobile POS terminal according to claim 2, wherein the second accommodation member (102) has an upper accommodation area and a lower accommodation area, the central recessed area being the upper accommodation area, and an outer bottom surface of the central recessed area, the second left side plate (1021), the second right side plate (1022), and the second rear side plate (1024) enclose to form the lower accommodation area.

4. The device housing of a mobile POS terminal according to claim 3, wherein the first rear side plate (1004) is provided with a first slot (10S1), and the second rear side plate (1024) is provided with a second slot (10S2) communicating with the lower accommodation area.

5. The device housing of a mobile POS terminal according to claim 3, wherein the first cover member (121) comprises:

a first arc-shaped plate (1210), provided with the top opening (1210), having a first edge, a second edge, a third edge, and a fourth edge, and having a concave surface and a convex surface;

a third left side plate (1211) connected to the first edge;

a third right side plate (1212) connected to the second edge;

a third front side plate (1213), connected to the third edge, the third left side plate (1211), and the third right side plate (1212), and provided with the edge notch (121N);

a second pivoting mechanism (1214), formed on the fourth edge, and pivotally connected to the first pivoting mechanism (102P);

a first left snap fastener (1215), formed on the concave surface of the first arc-shaped plate (1210) and adjacent to a left rim of the top opening (1210);

a first right snap fastener (1216), formed on the concave surface of the first arc-shaped plate (1210), adjacent to a right rim of the top opening (1210), and spaced apart from the first left snap fastener (1215) by a first distance;

a second left snap fastener (1217), formed on the concave surface of the first arc-shaped plate (1210) and adjacent to a front rim of the top opening (1210);

a second right snap fastener (1218), formed on the concave surface of the first arc-shaped plate (1210) to face the second left snap fastener (1217), adjacent to the front rim of the top opening (1210), and spaced apart from the second left snap fastener (1217) by a second distance;

a first left cushion block (1219), disposed on the convex surface of the first arc-shaped plate (1210) and adjacent to a rear rim of the top opening (1210);

a first right cushion block (121A), disposed on the convex surface of the first arc-shaped plate (1210), adjacent to the rear rim of the top opening (1210), and spaced apart from the first left cushion block (1219) by a third distance; and an inclined recess (121B), formed on the convex surface of the first arc-shaped plate (1210) and intersecting with the front rim of the top opening (1210);

wherein, the front protrusion (1007), the edge notch (121N), the third left side plate (1211) and the third right side plate (1212) jointly enclose to form the paper output port.

6. The device housing of a mobile POS terminal according to claim 5, wherein the mounting plate (122) comprises:

a substrate (1220) provided with a first notch (12R1), a second notch (12R2), a third notch (12R3), and a fourth notch (12R4);

the left snap-fit member (12F1) extending downward from a bottom surface of the substrate (1220);

the right snap-fit member (12F2), extending downward from the bottom surface of the substrate (1220) and being spaced apart from the left snap-fit member (12F1) by a third distance;

a first short rod (1221) disposed within the first notch (12R1);

a second short rod (1222) disposed within the second notch (12R2);

a third short rod (1223) disposed within the third notch (12R3); and a fourth short rod (1224) disposed within the fourth notch (12E4).

7. The device housing of a mobile POS terminal according to claim 6, wherein the first left snap fastener (1215) has a first socket to engage the first short rod (1221), and the first right snap fastener (1216) has a second socket to engage the second short rod (1222).

8. The device housing of a mobile POS terminal according to claim 6, wherein the first short rod (1221) has a first axis, and the second short rod (1222) has a second axis that is coaxial with the first axis.

9. The device housing of a mobile POS terminal according to claim 8, wherein the second cover member (123) comprises:

a second arc-shaped plate (1230) also having a first edge, a second edge, a third edge, and a fourth edge, wherein the first edge, the second edge, the third edge, and the fourth edge are respectively adjacent to the left rim, the right rim, the front rim, and the rear rim of the top opening (1210), and the second arc-shaped plate (1230) also has a concave surface and a convex surface;

a third left snap fastener (1231) formed on the concave surface of the second arc-shaped plate (1230);

a third right snap fastener (1232) formed on the concave surface of the second arc-shaped plate (1230); and at least one abutment plate (1233) formed on the concave surface of the second arc-shaped plate (1230) and extending to protrude from the fourth edge of the second arc-shaped plate (1230).

10. The device housing of a mobile POS terminal according to claim 9, wherein the liftable cover assembly (12) further comprises:

a rod (124), comprising:

a first rod member (1240);

a fifth short rod (1241) connected to one end of the first rod member (1240); and a sixth short rod (1242) connected to the other end of the first rod member (1240);

a block (125) having a top surface, a front surface, a bottom surface, a rear surface, a left surface, and a right surface, with an arc-shaped concave part (1251) formed on the front surface to engage the first rod member (1240); and at least one compression spring (126) sandwiched between the top surface and the bottom surface of the substrate (1220);

wherein the rear surface is an inwardly curved surface.

11. The device housing of a mobile POS terminal according to claim 10, wherein the second left snap fastener (1217) has a third engagement port to engage the fifth short rod (1241), and the second right snap fastener (1218) has a fourth engagement port to engage the sixth short rod (1242).

12. The device housing of a mobile POS terminal according to claim 11, wherein the third left snap fastener (1231) has a fifth engagement port to engage the third short rod (1223), and the third right snap fastener (1232) has a sixth engagement port to engage the fourth short rod (1224).

13. The device housing of a mobile POS terminal according to claim 12, wherein the third short rod (1223) has a third axis, and the fourth short rod (1224) has a fourth axis that is coaxial with the third axis.

14. The device housing of a mobile POS terminal according to claim 13, wherein the third axis is not coaxial with the first axis.

15. The device housing of a mobile POS terminal according to claim 12, wherein a top surface of the cover (11) is provided with a second left cushion block (111) and a second right cushion block (112).

* * * * *